(12) United States Patent
Nakayama

(10) Patent No.: US 9,013,721 B2
(45) Date of Patent: Apr. 21, 2015

(54) IMAGE FORMING APPARATUS, NON-TRANSITORY COMPUTER-READABLE RECORDING MEDIUM FOR STORING IMAGE FORMING PROGRAM, AND IMAGE FORMING METHOD

(75) Inventor: Toru Nakayama, Osaka (JP)

(73) Assignee: KYOCERA Document Solutions Inc. (JP)

( * ) Notice: Subject to any disclaimer, the term of this patent is extended or adjusted under 35 U.S.C. 154(b) by 298 days.

(21) Appl. No.: 13/284,090

(22) Filed: Oct. 28, 2011

(65) Prior Publication Data

US 2012/0105888 A1    May 3, 2012

(30) Foreign Application Priority Data

Nov. 1, 2010    (JP) .................................. 2010-245254

(51) Int. Cl.
  *G06F 3/12*    (2006.01)
  *G03G 15/00*    (2006.01)
  *H04N 1/00*    (2006.01)

(52) U.S. Cl.
  CPC ....... *G03G 15/5025* (2013.01); *H04N 1/00816* (2013.01)

(58) Field of Classification Search
  CPC ...................... G03G 15/5025; H04N 1/00816
  USPC ........................ 358/1.13, 1.15, 448, 474, 505
  See application file for complete search history.

(56) References Cited

U.S. PATENT DOCUMENTS

2006/0262340 A1* 11/2006 Lee .............................. 358/1.14

FOREIGN PATENT DOCUMENTS

| JP | 08-241401 | 9/1996 |
| JP | 2008153894 | 7/2008 |

* cited by examiner

*Primary Examiner* — Jacky X Zheng

(74) *Attorney, Agent, or Firm* — McDonnell Boehnen Hulbert & Berghoff LLP

(57) ABSTRACT

An image forming apparatus includes an area setting unit, a reading unit, a number recognizing unit, and a number determining unit. The area setting unit is configured to set a reading area on the basis of a page number. The reading unit is configured to read image data in the reading area. The number recognizing unit configured to recognize a number from a result of reading by the reading unit. The number determining unit is configured to compare results of recognizing of two consecutive pages by the number recognizing unit, determine the presence of consecutive numbers, and determine one of the consecutive numbers as the page number.

11 Claims, 4 Drawing Sheets

IMAGE FORMING APPARATUS, NON-TRANSITORY COMPUTER-READABLE RECORDING MEDIUM FOR STORING IMAGE FORMING PROGRAM, AND IMAGE FORMING METHOD

REFERENCE TO RELATED APPLICATIONS

This application is based upon and claims the benefit of priority from the corresponding Japanese Patent Application No. 2010-245254, filed in the Japan Patent Office on Nov. 1, 2010, the entire contents of which are incorporated herein by reference.

BACKGROUND

1. Technical Field

The present invention relates to a process in which an image forming apparatus (i) adds a new page number to image data generated by reading a document and (ii) outputs the resulting image.

2. Description of the Related Art

Examples of typical image forming apparatuses include a multifunction peripheral (MFP) having multiple functions, such as a normal print function, a scanner function, and an optical character recognition (OCR) function. For example, a typical image forming apparatus can recognize a page number from a document when reading the document with a scanner function. In this case, the typical image forming apparatus is capable of, for example, deleting the page number from image data of the read document and adding a new page number to the image data on the basis of the recognized page number.

Together with a page number, a date and a document number may be printed at predetermined positions on a document. The typical image forming apparatus may erroneously recognize such a number as a page number.

SUMMARY

An image forming apparatus according to the present disclosure includes an area setting unit, a reading unit, a number recognizing unit, and a number determining unit. The area setting unit is configured to set a reading area on the basis of a page number. The reading unit is configured to read image data in the reading area. The number recognizing unit is configured to recognize a number from a result of reading by the reading unit. The number determining unit is configured to compare results of recognizing of two consecutive pages by the number recognizing unit, determine the presence of consecutive numbers, and determine one of the consecutive numbers as the page number.

A non-transitory computer-readable recording medium according to the present disclosure stores an image forming program executed by a computer of an image forming apparatus. The image forming program includes first program code, second program code, third program code, and fourth program code. The first program code causes the computer to set a reading area on the basis of a page number. The second program code causes the computer to read image data in the reading area. The third program code causes the computer to recognize a number from a result of reading by the second program code. The fourth program code causes the computer to compare results of recognizing of two consecutive pages by the third program code, determine the presence of consecutive numbers, and determine one of the consecutive numbers as the page number.

An image forming method according to the present disclosure includes (i) an area setting unit setting a reading area on the basis of a page number; (ii) a reading unit reading image data in the reading area; (iii) a number recognizing unit recognizing a number from a result of reading by the reading unit; and (iv) a number determining unit comparing results of recognizing of two consecutive pages by the number recognizing unit, determining the presence of consecutive numbers, and determining one of the consecutive numbers as the page number.

Additional features and advantages are described herein, and will be apparent from the following Detailed Description and the figures.

DETAILED DESCRIPTION

Improving accuracy in recognizing a page number when page numbers are read and subjected to character recognition is achieved by comparing results of recognition performed on two consecutive pages by a number recognizing unit, determining the presence of consecutive numbers, and determining one of the consecutive numbers as the page number.

Figure 1:
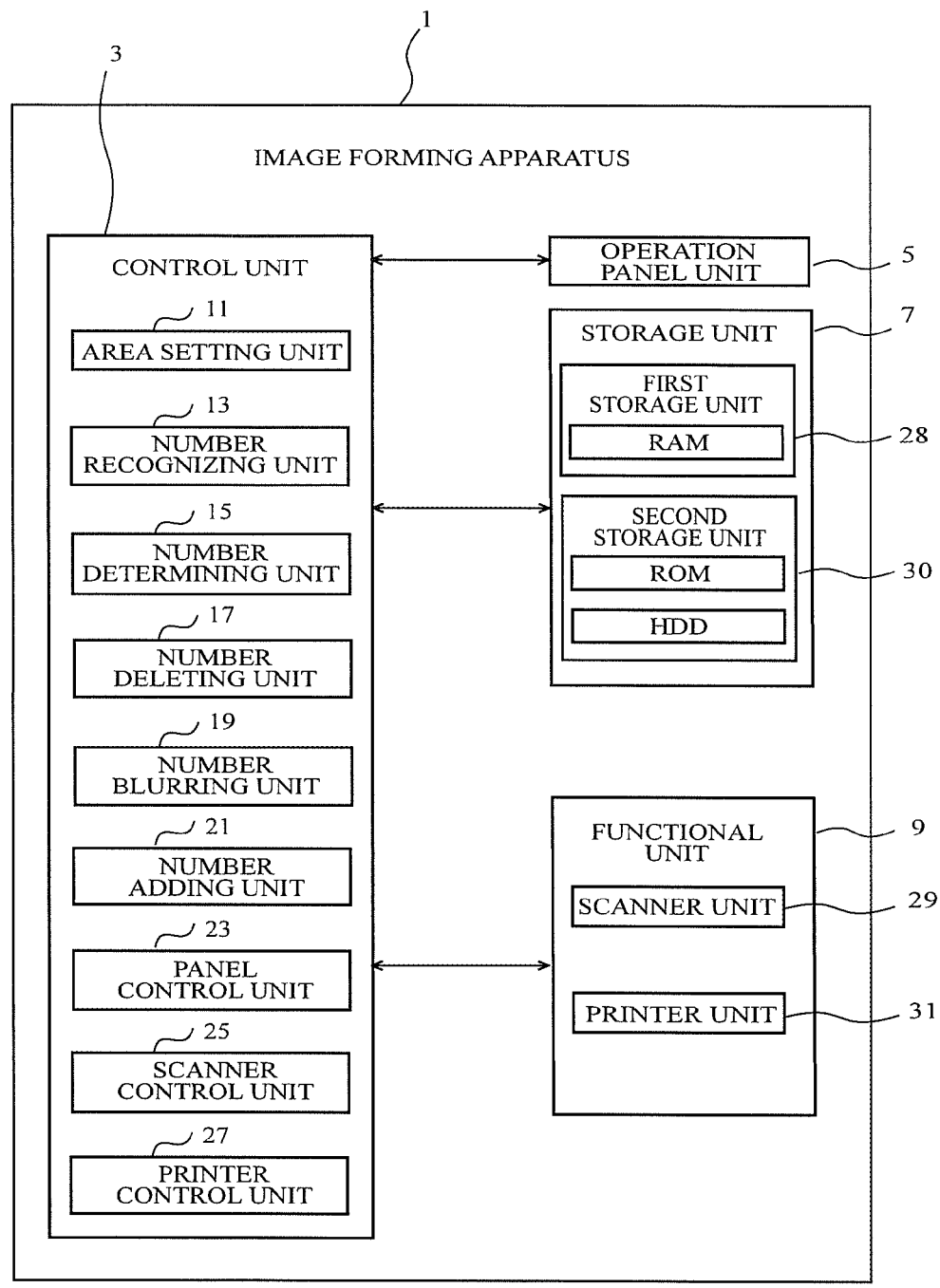
FIG. 1 illustrates a configuration of an image forming apparatus according to an embodiment of the present disclosure.

FIG. 1 illustrates a configuration of an image forming apparatus according to an embodiment of the present disclosure.

As illustrated in FIG. 1, image forming apparatus 1 includes control unit 3, operation panel unit 5, storage unit 7, and functional unit 9.

Control unit 3 is a control element such as a central processing unit (CPU). Control unit 3 executes a software program, such as an image forming program, to perform various control and other operations.

Operation panel unit 5 includes a touch panel liquid-crystal display screen. Operation panel unit 5 displays operation instructions for various functional units of image forming apparatus 1, and also displays operation states.

Storage unit 7 includes first storage unit 28 and second storage unit 30 that serve as internal storage devices. Storage unit 7 stores software programs, such as various applications, and data necessary for various functions, such as setting data necessary for operations.

First storage unit 28 includes a random access memory (RAM) serving as a main storage unit. Second storage unit 30 includes a read only memory (ROM) serving as a main storage device and a hard disk serving as an auxiliary storage device.

Functional unit 9 includes scanner unit 29 serving as a reading unit, and printer unit 31. Scanner unit 29 performs a scanning process to read image data of documents. Printer unit 31 performs an image output process on input image data.

By having the control unit 3 execute the image forming program, image forming apparatus 1 acts as area setting unit 11, number recognizing unit 13, number determining unit 15, number deleting unit 17, number blurring unit 19, number adding unit 21, panel control unit 23, scanner control unit 25, and printer control unit 27.

Area setting unit 11 sets a reading area selected in a document page deletion field in operation panel unit 5 as the reading area used when scanner unit 29 reads image data on the basis of the page number.

Number recognizing unit 13 performs a character recognition process (e.g., OCR process) on Arabic numeral characters in image data of a document read by scanner unit 29, the Arabic numeral characters being candidates for the page numbers. Then, number recognizing unit 13 generates a recognition result.

From the recognition results generated for two consecutive pages by number recognizing unit 13, number determining unit 15 determines the presence of consecutive Arabic numeral characters.

If it is determined that there are consecutive Arabic numeral characters, number determining unit 15 determines the Arabic numeral character on the first page of the two consecutive pages as the page number, and generates this as a determination result.

If there is no Arabic numeral character subsequent to the Arabic numeral character on the second page of the two consecutive pages where consecutive Arabic numeral characters are determined to be present, number determining unit 15 may determine the Arabic numeral character on the second page as the page number and generate the determination result. Specifically, if there is no subsequent Arabic numeral character between the second page and the following page, number determining unit 15 may determine the Arabic numeral character on the second page as the page number and generate the determination result. Alternatively, if there is no page following the second page, number determining unit 15 may determine the Arabic numeral character on the second page as the page number and generate the determination result.

If number determining unit 15 determines that there are consecutive Arabic numeral characters on two consecutive pages, number deleting unit 17 generates a deletion result of a deleting process performed on an Arabic numeral character. Number deleting unit 17 performs the deleting process by capturing a color around a bounding box that serves as an area for displaying an Arabic numeral character, and filling the bounding box with the captured color.

This deleting process is performed on the Arabic numeral character on the first page of the two consecutive pages. This means that the Arabic numeral character determined as the page number is deleted.

Therefore, after the page number described in the document is properly determined and deleted, it becomes possible to add a new page number.

If number determining unit 15 does not determine that there are consecutive Arabic numeral characters, number blurring unit 19 performs a blurring process on bounding boxes for Arabic numeral characters. For example, the bounding boxes are shaded with a checkered pattern by number blurring unit 19.

This can eliminate the possibility of deleting an Arabic numeral character that is not the page number. Moreover, a newly added page number can be clearly distinguished from the blurred Arabic numeral character.

Number adding unit 21 adds the new page number to image data of the document from which an Arabic numeral character has been deleted.

Panel control unit 23 performs various control operations in accordance with display control of operation panel unit 5 and selection operations on the screen of operation panel unit 5. For example, in accordance with an operation on the screen of operation panel unit 5, panel control unit 23 outputs an instruction signal to area setting unit 11 and number adding unit 21.

Scanner control unit 25 controls an operation of scanner unit 29.

Printer control unit 27 controls an operation of printer unit 31.

Figure 2:
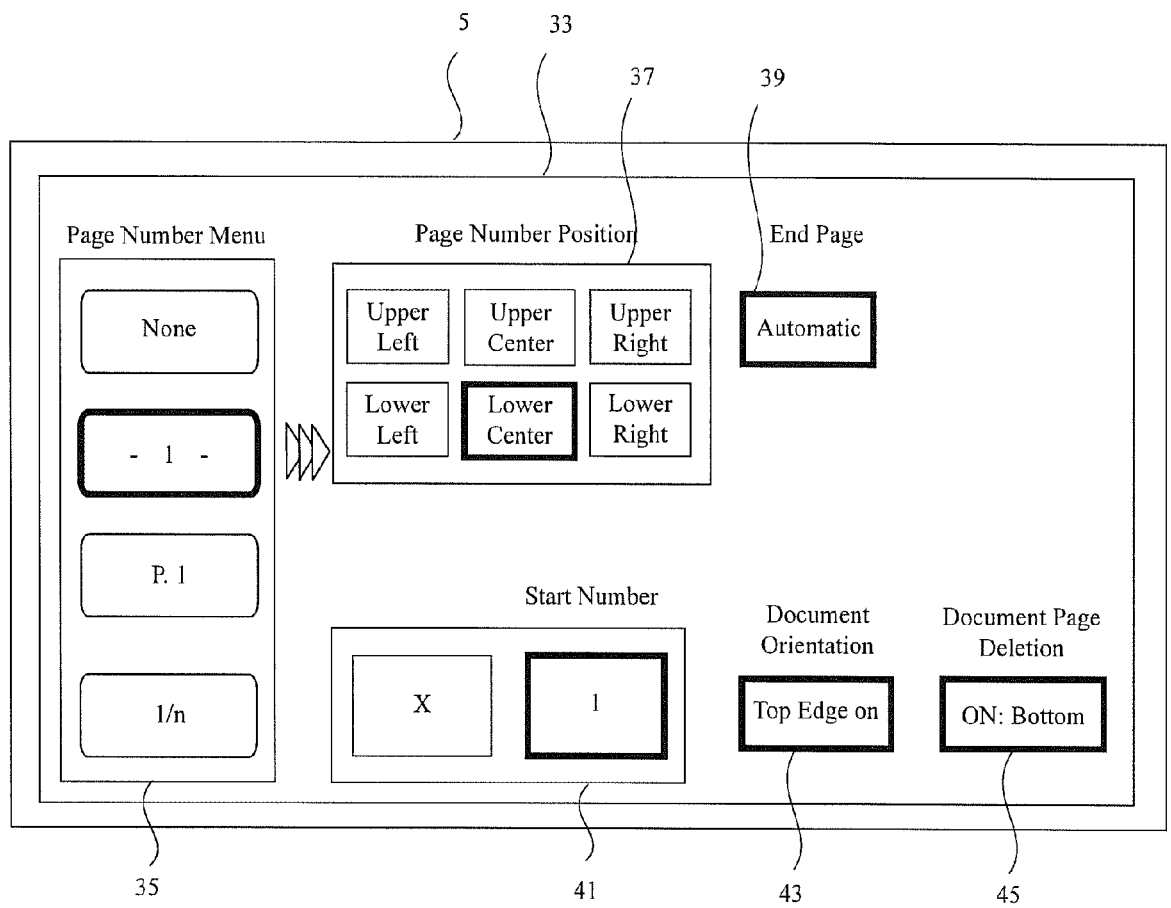
FIG. 2 illustrates a setting screen displayed in an operation panel unit of the image forming apparatus for addition of page numbers.

FIG. 2 illustrates a setting screen displayed, for addition of page numbers, in operation panel unit 5 of the image forming apparatus according to the embodiment of the present disclosure.

In response to a key operation for setting conditions for addition of page numbers, page number addition screen 33 is displayed in operation panel unit 5.

Page number addition screen 33 includes page number menu field 35, page number position field 37, end page field 39, start number field 41, document orientation field 43, and document page deletion field 45.

Page number menu field 35 allows selection of a format of page numbers that are to be added.

The present embodiment provides "-1-", "P. 1", "1/n", and "None" as formats of page numbers that are to be added. In FIG. 2, "-1-" is selected and highlighted with a bold frame.

Page number position field 37 allows selection of a position of page numbers that are to be added.

The present embodiment provides "Upper Left", "Lower Left", "Upper Center", "Lower Center", "Upper Right", and "Lower Right" as positions of page numbers that are to be added. In FIG. 2, "Lower Center" is selected and highlighted with the bold frame.

End page field 39 allows specifying an end page to which the new page numbers are to be added to read documents. For example, when four documents are read and new page numbers are to be added to only two pages, an end page "2" is specified in end page field 39.

The end page can be entered either automatically or manually as described above. In the case of automatic entry, the page numbers are added to all pages. In FIG. 2, "Auto" is selected in end page field 39. If a number is manually entered in end page field 39, the number entered is specified as an end page.

Start number field 41 allows selection and entry of a number. This entry allows specifying the page number to be added to the first page of read documents.

In the example of FIG. 2, where "1" is entered in start number field 41, "1" is added to the first page of read documents.

Document orientation field 43 allows selection of an orientation of documents.

The present embodiment provides "Top Edge on Top" and "Top Edge on Left" as orientations of documents. Specifically, "Top Edge on Top" can be selected when the top Edge of documents is to be located on the Top side, that is far side, of a document feed tray of the image forming apparatus, and "Top Edge on Left" can be selected when the top Edge of documents is to be located on the left side of the document feed tray. In FIG. 2, "Top Edge on Top" is selected and highlighted with the bold frame.

Document page deletion field 45 allows selection of the reading area where the scanner unit reads the page numbers.

The present embodiment provides "ON: Top", "ON: Bottom", "ON: Edges", and "OFF". The reading area for reading the page numbers is set by selecting one of them.

If "OFF" is selected, the scanner unit does not perform a reading process for reading the page numbers, and no page number is added.

In the present embodiment, "ON: Bottom" is selected and highlighted with a bold frame.

Figure 3A:
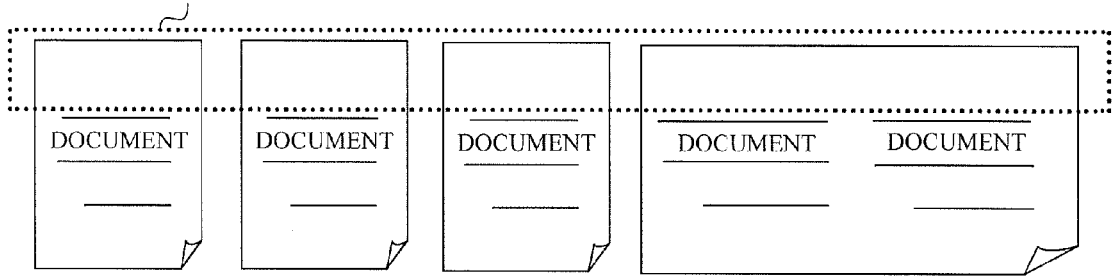
FIG. 3A illustrates a reading area specified at top ends of pages for addition of page numbers.
Figure 3B:
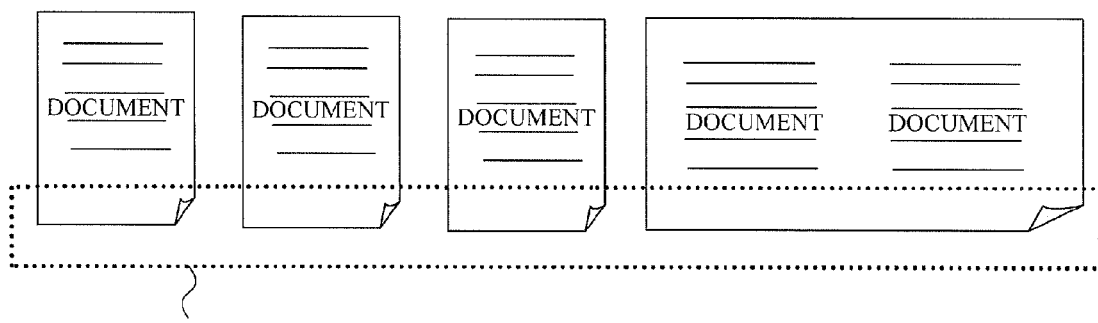
FIG. 3B illustrates a reading area specified at bottom ends of pages for addition of page numbers.
Figure 3C:
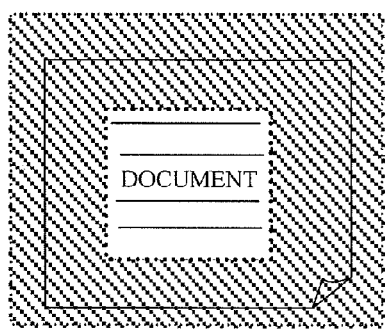
FIG. 3C illustrates a reading area specified along edges of a page for addition of page numbers.

If one of "ON: Top", "ON: Bottom", and "ON: Edges" is selected in document page deletion field 45 of operation panel unit 5, one of reading areas 47, 49, and 51 illustrated in FIG. 3A to FIG. 3C can be selected.

For example, if "ON: Top" is selected in document page deletion field 45, an area extending from the top end of the page to the description area of the page (see FIG. 3A) is set as the reading area. If "ON: Bottom" is selected in document page deletion field 45, an area extending from the bottom end of the page to the description area of the page (see FIG. 3B) is set as the reading area. If "ON: Edges" is selected in document page deletion field 45, an area surrounding the description area of the page (see FIG. 3C) is set as the reading area.

Thus, when one of reading areas 47, 49, and 51 is selected, the area setting unit can cause the scanner unit to perform the reading process.

In the image forming apparatus of the present embodiment, number addition information provided by page number addition screen 33 displayed in operation panel unit 5 is selected, so that the reading process of the document, a recognizing process, and the like are performed.

As a result, the Arabic numeral character on the first page of the two consecutive pages is added as the page number to image data of the first page only if consecutive Arabic numeral characters are recognized on two consecutive pages.

Therefore, the number recognizing unit can reduce the possibility of erroneous recognition of the page number on the document, and increase the speed of the recognizing process.

Figure 4:
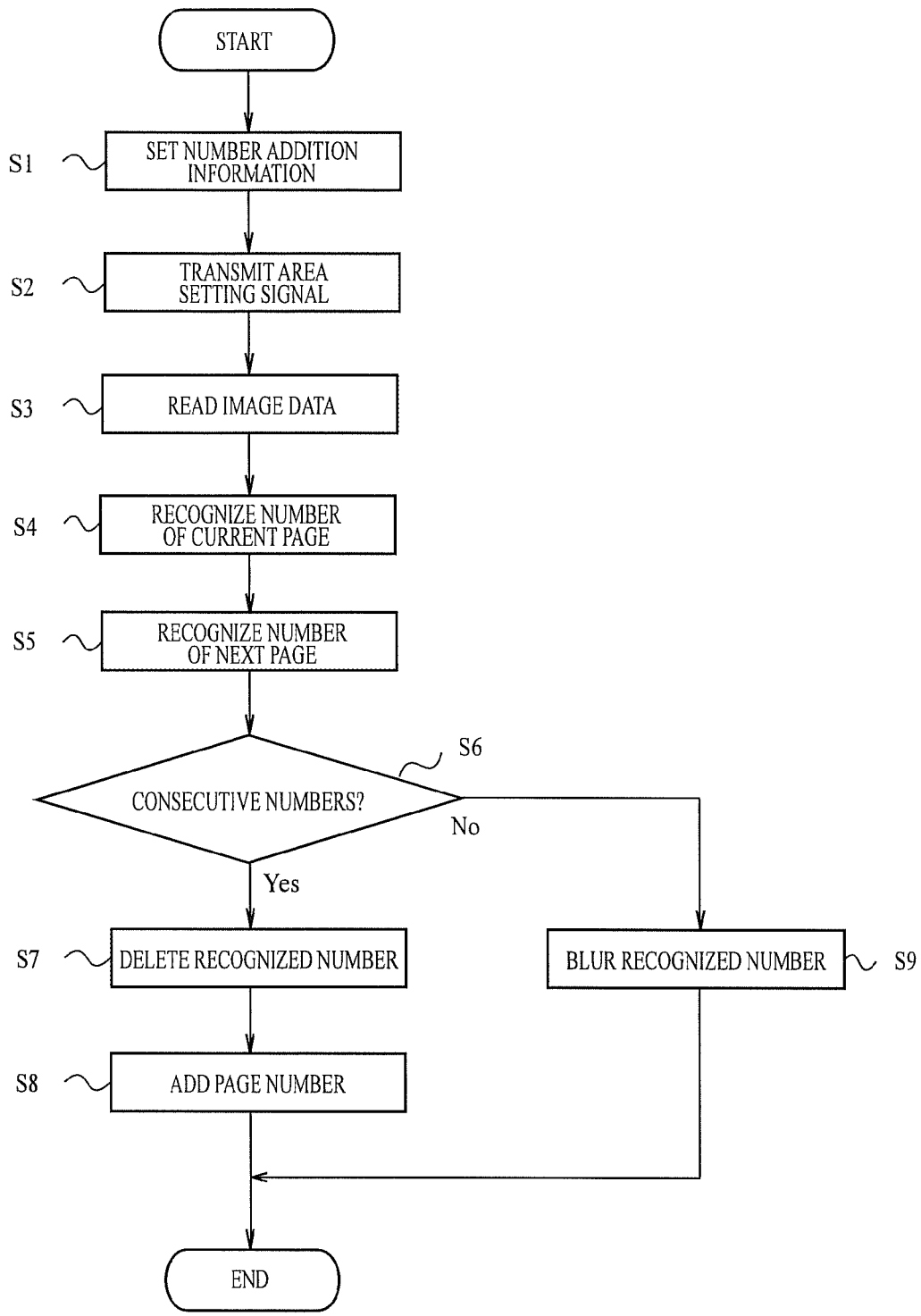
FIG. 4 illustrates a flowchart of an image forming process according to an embodiment of the present disclosure.

FIG. 4 illustrates a flowchart of an image forming process according to an embodiment of the present disclosure.

In the image forming apparatus according to the embodiment of the present disclosure, when the document is placed on the document feed tray (not shown) that feeds the document to the scanner unit, an image forming process is performed in sequence, starting with step S1 of FIG. 4.

In step S1, when the user selects a number adding function in the operation panel unit, the panel control unit displays the page number addition screen in the operation panel unit.

The page number addition screen allows the user to select various settings of number addition information. In accordance with user selections, the panel control unit generates various instruction signals.

For example, in accordance with selections on page number addition screen 33 illustrated in FIG. 2, the panel control unit generates instruction signals as described below.

If "-1-" is selected in page number menu field 35 as the format of page numbers to be added, the panel control unit generates a number format signal representing "-1-".

If "Lower Center" is selected in page number position field 37 as the position of the new page numbers to be added, the panel control unit generates the page number position signal representing "Lower Center".

End page field 39 allows specifying an end page to which the page numbers are to be added to read documents. If "Auto" is selected in end page field 39, the panel control unit generates an end page signal representing "Auto".

If "1" is entered in start number field 41 as the page number to be added to the first page of read documents, the panel control unit generates a start number signal representing "1".

If "Top Edge on Top" is selected in document orientation field 43 as the orientation of documents, the panel control unit generates a document orientation signal representing "Top Edge on Top".

If "ON: Bottom" is selected in document page deletion field 45 as the reading area for the scanner unit, the panel control unit generates the reading area signal representing "ON: Bottom".

The panel control unit accepts the signals in response to the selections described above. Then, the process proceeds to step S2 of FIG. 4.

In step S2, the area setting unit receives the reading area signal generated in step S1. The area setting unit transmits, to the scanner unit, an area setting signal indicating that the reading process is to be performed. Then, the process proceeds to step S3.

In step S3, the scanner unit performs the reading process on image data of the document in a specified reading area, and generates a reading result. For example, if the selected reading area is "ON: Bottom", the scanner unit performs the reading process in reading area 49 illustrated in FIG. 3B. The scanner unit transmits the generated reading result to the first storage unit. At the same time, the scanner unit transmits a completion signal to the number recognizing unit to indicate that generation of the reading result has been completed. Then, the process proceeds to step S4 of FIG. 4.

In step S4, upon receipt of the completion signal, the number recognizing unit transmits a request signal to the first storage unit to request transmission of the reading result for a read page (hereinafter referred to as a current page). The number recognizing unit receives the reading result for the current page from the first storage unit.

The number recognizing unit performs a number recognizing process on the received reading result to recognize an Arabic numeral character.

After performing the number recognizing process, the number recognizing unit generates the recognition result and transmits it to the number determining unit. The recognition result includes cases where the number can be recognized and where the number cannot be recognized.

After receiving the recognition result, the number determining unit transmits a number-recognition instruction signal to the number recognizing unit as an instruction to perform the number recognizing process on the next page. Then, the process proceeds to step S5.

In step S5, the number recognizing unit transmits a request signal to the first storage unit to request transmission of the reading result for the next page. The number recognizing unit receives the reading result for the next page from the first storage unit. The number recognizing unit performs the number recognizing process on the received reading result for the next page to recognize an Arabic numeral character.

The number recognizing unit generates the recognition result for the next page and transmits the generated recognition result for the next page to the number determining unit.

The operation in step S5 is performed on all reading results stored in the first storage unit. Then, the process proceeds to step S6.

In step S6, the number determining unit compares recognition results for two consecutive pages so as to determine the presence of consecutive Arabic numeral characters.

If it is determined that there are consecutive Arabic numeral characters on the two consecutive pages (YES in step S6), the number determining unit determines the Arabic numeral character on the current page as the page number for the current page and generates the determination result for the current page.

The number determining unit transmits the generated determination result to the number deleting unit. Then, the process proceeds to step S7.

If it is not determined, from the recognition results for the two consecutive pages, that there are consecutive Arabic numeral characters (NO in step S6), the number determining unit transmits this determination result to the number blurring unit. The process then proceeds to step S9, which will be described later on.

In step S7, the number deleting unit captures a color around a bounding box serving as an area for displaying the determined Arabic numeral character, and deletes the Arabic numeral character by filling the bounding box with the captured color.

In the present embodiment, for example, if "Auto" is set in the end page field on the page number addition screen of the operation panel unit, a number deleting process is performed on Arabic numeral characters determined as the page numbers on all pages of documents.

The number deleting unit generates a number deletion result and transmits it to the number adding unit. Then, the process proceeds to step S8.

In step S8, for the number deletion result received from the number deleting unit, the number adding unit receives various signals, including a start number signal and others for the number addition information setting, and adds the page numbers in sequence, starting with the number entered.

For example, if "1" is entered in the start number field, the page numbers are added in sequence, starting with 1, to all documents.

As described above, if the number determining unit does not determine in step S6 that there are consecutive Arabic numeral characters, the process proceeds to step S9. In step S9, from the received determination results, the number blurring unit performs the blurring process on bounding boxes for a plurality of Arabic numeral characters, for example, such that the bounding boxes are shaded with a checkered pattern.

As described above, in the image forming apparatus of the present embodiment, the number determining unit can determine the presence of consecutive Arabic numeral characters by comparing the recognition results generated from two consecutive pages. It is thus possible to determine the first of the consecutive Arabic numeral characters as the page number.

Therefore, it is possible to improve accuracy in recognizing the page number when the page numbers of documents are read and subjected to recognition.

Although embodiments of the present disclosure have been described, the present disclosure is not limited to them and various modifications can be made.

In the embodiments described above, Arabic numeral characters are used as objects to be recognized as the page numbers of documents by the number recognizing unit. However, objects to be recognized are not limited to Arabic numeral characters. For example, Chinese numeral characters or Roman numeral characters may be used as objects to be recognized.

In the embodiments described above, the number determining unit determines the presence of consecutive Arabic numeral characters. Here, determining that there are consecutive Arabic numeral characters does not simply mean to determine that Arabic numeral characters on multiple pages are consecutive. It also means to recognize that there are consecutive odd or even Arabic numeral characters on multiple odd-numbered or even-numbered pages.

It should be understood that various changes and modifications to the embodiments presently described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus comprising:
    an area setting unit configured to set a reading area on the basis of a page number;
    a reading unit configured to read image data in the reading area of two consecutive pages;
    a number recognizing unit configured to recognize a number from a result of reading the two consecutive pages by the reading unit;
    a number determining unit configured to compare results of recognizing of the two consecutive pages by the number recognizing unit, determine a presence of consecutive numbers, and determine one of the consecutive numbers as the page number;
    a number deleting unit configured to delete the page number from the image data determined by the number determining unit;
    a number adding unit configured to add a new page number to the image data from which the page number has been added; and
    a number blurring unit configured to perform a blurring process for shading the recognized number with a pattern if the number determining unit does not determine that there are consecutive numbers.

2. The image forming apparatus according to claim 1, wherein the number determining unit determines the number on a first page of the two consecutive pages as the page number upon determining that there are consecutive numbers on the two consecutive pages.

3. The image forming apparatus according to claim 2, wherein the number determining unit determines the number on a second page as the page number if there is no number subsequent to the number on the second page of the two consecutive pages where consecutive numbers are determined to be present.

4. A non-transitory computer-readable recording medium that stores an image forming program executed by a computer of an image forming apparatus, the image forming program comprising:
    a first program code causing the computer to set a reading area on the basis of a page number;
    a second program code causing the computer to read image data in the reading area of two consecutive pages;
    a third program code causing the computer to recognize a number from a result of reading the two consecutive pages by the second program code;
    a fourth program code causing the computer to compare results of recognizing of the two consecutive pages by the third program code, determine a presence of consecutive numbers, and determine one of the consecutive numbers as the page number;
    a fifth program code causing the computer to delete the page number from the image data determined by the fourth program code;
    a sixth program code causing the computer to add a new page number to the image data from which the page number has been deleted; and a seventh program code causing the computer to perform a blurring process for shading the recognized number with a pattern if the fourth program code does not determine that there are not consecutive numbers.

5. The non-transitory computer-readable recording medium according to claim 4, wherein the third program code causes the computer to determine the number on a first page of the two consecutive pages as the page number upon determining that there are consecutive numbers on the two consecutive pages.

6. The non-transitory computer-readable recording medium according to claim 5, wherein the third program code causes the computer to determine the number on a second page as the page number if there is no number subsequent to the number on the second page of the two consecutive pages where consecutive numbers are determined to be present.

7. An image forming method comprising:
- an area setting unit setting a reading area on the basis of a page number;
- a reading unit reading image data in the reading area of two consecutive pages;
- a number recognizing unit recognizing a number from a result of reading the two consecutive pages by the reading unit;
- a number determining unit comparing results of recognizing of the two consecutive pages by the number recognizing unit, determining a presence of consecutive numbers, and determining one of the consecutive numbers as the page number;
- a number deleting unit deleting the page number from the image data determined by the number determining unit;
- a number adding unit adding a new page number to the image data from which the page number has been deleted;
- a number blurring unit performing a blurring process for shading the recognized number with a pattern if the number determining unit does not determine that there are consecutive numbers.

8. The image forming method according to claim 7, wherein the number determining unit determines the number on a first page of the two consecutive pages as the page number upon determining that there are consecutive numbers on the two consecutive pages.

9. The image forming method according to claim 8, wherein the number determining unit determines a number on the second page as the page number if there is no number subsequent to the number on the second page of the two consecutive pages where consecutive numbers are determined to be present.

10. The image forming method according to claim 7, wherein the consecutive numbers are Arabic numeral characters.

11. The image forming method according to claim 7, wherein the consecutive numbers are characters selected from the group consisting of Chinese numeral characters and Roman numeral characters.

* * * * *